(12) United States Patent
Honjo et al.

(10) Patent No.: US 11,066,182 B2
(45) Date of Patent: Jul. 20, 2021

(54) CONTROL APPARATUS, CAMERA APPARATUS, FLYING OBJECT, CONTROL METHOD AND PROGRAM

(71) Applicant: SZ DJI TECHNOLOGY CO., LTD., Shenzhen (CN)

(72) Inventors: Kenichi Honjo, Shenzhen (CN); Yoshinori Nagayama, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/726,510

(22) Filed: Dec. 24, 2019

(65) Prior Publication Data
US 2020/0130862 A1  Apr. 30, 2020

Related U.S. Application Data

(63) Continuation of application No. PCT/CN2018/111258, filed on Oct. 22, 2018.

(30) Foreign Application Priority Data

Oct. 26, 2017 (JP) .............................. JP2017-207554

(51) Int. Cl.
*B64D 47/08* (2006.01)
*B64C 39/02* (2006.01)
*H04N 5/232* (2006.01)
*H04N 5/225* (2006.01)

(52) U.S. Cl.
CPC ............. *B64D 47/08* (2013.01); *B64C 39/02* (2013.01); *H04N 5/232* (2013.01); *B64C 2201/127* (2013.01); *H04N 5/2257* (2013.01)

(58) Field of Classification Search
CPC ............................... B64D 47/08; H04N 5/232
See application file for complete search history.

(56) References Cited

U.S. PATENT DOCUMENTS

| 2015/0109479 | A1* | 4/2015 | Kimoto | H04N 5/23218 |
| | | | | 348/231.99 |
| 2017/0099428 | A1* | 4/2017 | Okuyama | H04N 5/23245 |
| 2017/0101178 | A1 | 4/2017 | Lee | |

(Continued)

FOREIGN PATENT DOCUMENTS

| CN | 205311921 U | 6/2016 |
| CN | 205507553 U | 8/2016 |

(Continued)

OTHER PUBLICATIONS

The World Intellectual Property Organization (WIPO) International Search Report for PCT/CN2018/111258 dated Feb. 11, 2019 6 Pages (including translation).

*Primary Examiner* — Clayton E. LaBalle
*Assistant Examiner* — Dennis Hancock
(74) *Attorney, Agent, or Firm* — Anova Law Group, PLLC

(57) ABSTRACT

A control apparatus, a camera apparatus, a flying object, a control method and a program are provided. The control apparatus is configured to control a driving of a focus lens included in a camera apparatus. The control apparatus includes a memory, storing a program; and a processor, configured to execute the program to set a drive range of the focus lens based on a height of the camera apparatus away from a reference position, and control the driving of the focus lens in the drive range.

7 Claims, 4 Drawing Sheets

(56) References Cited

U.S. PATENT DOCUMENTS

2017/0353654 A1* 12/2017 Kato .................... G06T 7/50
2020/0132963 A1*  4/2020 Honjo ............... F16M 11/2071

FOREIGN PATENT DOCUMENTS

| CN | 106290246 A | 1/2017 |
|---|---|---|
| CN | 107065894 A | 8/2017 |
| JP | 2006317593 A | 11/2006 |
| JP | 2008275890 A | 11/2008 |
| JP | 2011183824 A | 9/2011 |
| JP | 2015106840 A | 6/2015 |
| JP | 2015200737 A | 11/2015 |

* cited by examiner

| Connection target | Height of the camera apparatus | Drive range of the focus lens |
|---|---|---|
| UAV | Greater than or equal to the threshold | Infinity to 3.3 m |
| UAV | Less than the threshold | Infinity to 1.0 m |
| Other than UAV or no connection target | | Infinity to 1.0 m |

CONTROL APPARATUS, CAMERA APPARATUS, FLYING OBJECT, CONTROL METHOD AND PROGRAM

CROSS-REFERENCE TO RELATED APPLICATION

This application is a continuation of International Application No. PCT/CN2018/111258, filed Oct. 22, 2018, which claims priority to JP patent application No. 2017-207554, filed Oct. 26, 2017, the entire content of all of which is incorporated herein by reference.

TECHNICAL FIELD

The present disclosure relates to a control apparatus, a camera apparatus, a flying object, a control method and a program.

BACKGROUND

Flying objects may include unmanned aerial vehicles, and other aircrafts, airships, helicopters, and the like, moving in the air. For example, unmanned aerial vehicles may be used as aerial photography tools, for capturing images and videos. During a flight of the unmanned aerial vehicle, most subjects captured by a camera apparatus mounted on the unmanned aerial vehicle may be physically far from the camera apparatus. In an automatic focusing process, the camera apparatus may not necessarily control the driving of a focus lens in an entire drivable range of the focus lens.

SUMMARY

In accordance with the disclosure, a control apparatus is provided in the present disclosure. The control apparatus includes a memory storing a program, and a processor configured to execute the program to set a drive range of a focus lens based on a height of a camera apparatus away from a reference position, and control the driving of the focus lens in the drive range.

Also in accordance with the disclosure, a camera apparatus is provided in the present disclosure. The camera apparatus includes a control apparatus and an image sensor. The control apparatus includes a memory storing a program and a processor configured to set a drive range of a focus lens based on a height of a camera apparatus away from a reference position and control the driving of the focus lens in the drive range. The image sensor is configured to capture an optical image formed by the focus lens.

Also in accordance with the disclosure, a control method is provided in the present disclosure. The control method includes setting a drive range of a focus lens based on a height of the camera apparatus away from a reference position and controlling the driving of the focus lens in the drive range.

BRIEF DESCRIPTION OF THE DRAWINGS

In order to more clearly illustrate technical solutions in embodiments of the present disclosure, drawings required for describing the embodiments are briefly illustrated hereinafter. Obviously, the following drawings are merely examples for illustrative purposes according to various disclosed embodiments of the present disclosure and are not intended to limit the scope of the present disclosure. Those skilled in the art may obtain other drawings according to the drawings of the present disclosure without any creative efforts.

DETAILED DESCRIPTION OF THE EMBODIMENTS

Figure 1:
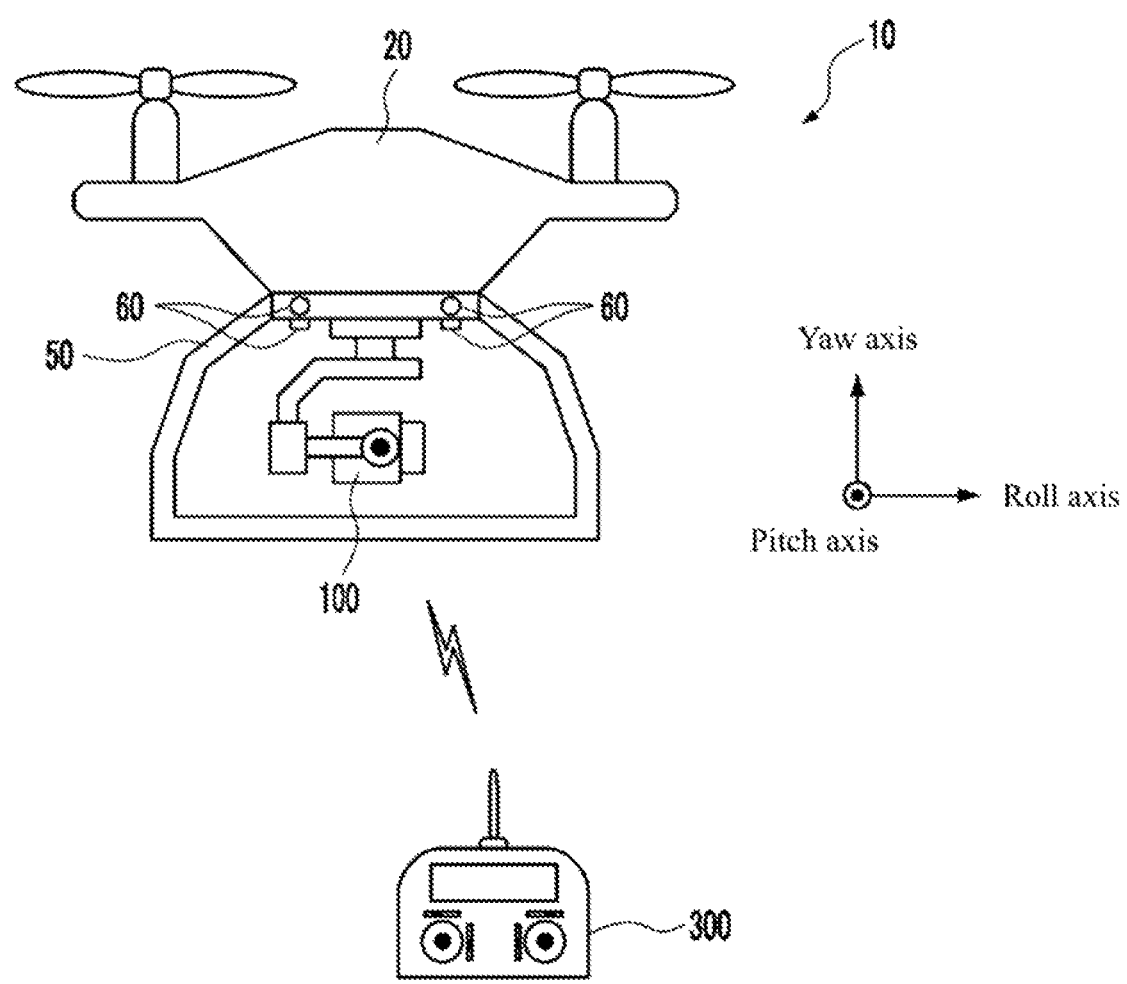
FIG. 1 illustrates an appearance schematic of an unmanned aerial vehicle and a remote operation device according to disclosed embodiments of the present disclosure.

The present disclosure may be described with the embodiments of the present disclosure. However, the following embodiments may not limit the scope of the present disclosure. In addition, all combinations of features described in the embodiments may not be necessarily required for the inventive disclosure. It is apparent to those skilled in the art that various modifications or improvements may be added to the following embodiments. It is apparent from the description of the claims that the manners in which such changes or improvements are added are within the technical scope of the present disclosure.

The claims, the specification, the drawings of the specification, and the abstract of the specification include matters that are protected by copyright. As long as anyone reproduces these documents as indicated by the patent office's documents or records, the copyright owner may not object. However, all copyrights are reserved in all other cases.

Various embodiments of the present disclosure may be described with reference to flow charts and block diagrams. A block may represent (1) a stage of a process of performing an operation or (2) a "element" of a device performing an operation herein. A certain stage and "element" may be implemented by programmable circuits and/or processors. The dedicated circuits may include digital and/or analog hardware circuits, and also may include integrated circuits (ICs) and/or discrete circuits. Programmable circuits may include reconfigurable hardware circuits. Reconfigurable hardware circuits may include logical AND, logical OR, logical XOR, logical NAND, logical NOR, other logical operations, flip-flops, registers, field programmable gate arrays (FPGAs), programmable logic arrays (PLAs), and other memory components.

The computer-readable medium may include any tangible device that may store instructions executed by a suitable device. As a result, the computer-readable medium having instructions stored thereon may include a product, and the product may include means that may be executed to create the operations specified by the flow chart or the block diagram. As examples of the computer-readable medium, an electronic storage medium, a magnetic storage medium, an optical storage medium, an electromagnetic storage medium, a semiconductor storage medium, and the like may be included.

The computer-readable medium may have more specific examples, including a floppy disk (registered trademark), a floppy disk, a hard disk, a random access memory (RAM), a read-only memory (ROM), an erasable programmable read-only memory (EPROM or flash memory), an electrically erasable programmable read-only memory (EEPROM), a static random access memory (SRAM), a compact disc read-only memory (CD-ROM), a digital versatile disc (DVD), a Blu-ray® disc, a memory stick, a IC card, and the like.

Computer-readable instructions may include any one of source code or object code described by any combination of one or more programming languages. The source or object code includes traditional procedural programming languages. Traditional programming languages may be assembly instructions, instruction set architecture (ISA) instructions, machine instructions, machine-related instructions, microcode, firmware instructions, state setting data, Smalltalk, JAVA (registered trademark), C++ object-oriented programming languages, C programming languages, or similar programming languages. The computer-readable instructions may be provided to a processor or a programmable circuit of a general-purpose computer, a dedicated computer, or other programmable data processing devices locally or via a wide area network (WAN) such as a local area network (LAN) or the Internet. A processor or programmable circuit may execute computer-readable instructions to create means for performing the operations specified in the flow chart or the block diagram. Examples of the processor may include a computer processor, a processing unit, a microprocessor, a digital signal processor, a controller, a microcontroller, and the like.

FIG. 1 illustrates an example of the appearance of an unmanned aerial vehicle (UAV) 10 and a remote operation device 300. The UAV 10 may include a UAV main body 20, a universal mount 50, a plurality of camera apparatuses 60, and a camera apparatus 100. The universal mount 50 and the camera apparatus 100 may be an example of a capturing system. The UAV 10 may be an example of a flying object moving in the air. The flying objects may include not only the UAVs, but also other aircrafts, airships, helicopters, and the like moving in the air.

The UAV main body 20 may have a plurality of propellers which may be an example of a propulsion element. The UAV main body 20 may control the rotation of the plurality of propellers to fly the UAV 10. The UAV main body 20 may use, for example, four propellers to fly the UAV 10. The number of the propellers may not be limited to four, which may not be limited according to various embodiments of the present disclosure. In addition, the UAV 10 may be a fixed-wing aircraft without propellers.

The camera apparatus 100 may be a camera for capturing a subject included in an expected capturing range. The universal mount 50 may rotatably support the camera apparatus 100. The universal mount 50 may be an example of a supporting system. For example, the universal mount 50 may use an actuator to rotatably support the camera apparatus 100 along a pitch axis, and the universal mount 50 may use the actuator to further rotatably support the camera apparatus 100 using a roll axis and a yaw axis as a center, respectively. The universal mount 50 may change an attitude of the camera apparatus 100 by rotating the camera apparatus 100 using one of the yaw axis, the pitch axis and the roll axis as the center.

The plurality of camera apparatuses 60 may be sensing cameras for capturing a surrounding of the UAV 10 for controlling the flight of the UAV 10. Two camera apparatuses 60 may be disposed at an aircraft nose, that is a front side, of the UAV 10; in addition, other two camera apparatuses 60 may be disposed at a bottom side of the UAV 10. The two camera apparatuses 60 at the front side may be paired to function as a so-called stereo camera. The two camera apparatuses 60 at the bottom side may also be paired to function as the so-called stereo camera. The three-dimensional spatial data surrounding the UAV 10 may be generated based on images captured by the plurality of camera apparatuses 60. A number of the camera apparatuses 60 included in the UAV 10 may not be limited to four, which may not be limited according to various embodiments of the present disclosure. The UAV 10 may only need to include at least one camera apparatus 60. The UAV 10 may also respectively include at least one camera apparatus 60 at the aircraft nose, the aircraft tail, the sides, the bottom and the top. A settable viewing angle of the camera apparatus 60 may be greater than A settable viewing angle of the camera apparatus 100. The camera apparatus 60 may also include a single focus lens or a fisheye lens.

The remote operation device 300 may communicate with the UAV 10 to remotely operate the UAV 10. The remote operation device 300 may perform wireless communication with the UAV 10. The remote operation device 300 may transmit instruction information of various instructions, related to the movement of the UAV 10, to the UAV 10, and the instruction information may include ascent, descent, acceleration, deceleration, forward, backward, rotation, and the like. The instruction information may include, for example, information for increasing the UAV height. The instruction information may indicate the height that the UAV 10 should be located. The UAV may move to a height indicated by the instruction information received from the remote operation device 300. The instruction information may include an ascent instruction to increase the UAV 10 height. The UAV 10 may increase the height when receiving the ascent instruction. When the height of the UAV 10 reaches an upper limit, the UAV 10 may also limit the ascent even receiving the ascent instruction.

Figure 2:
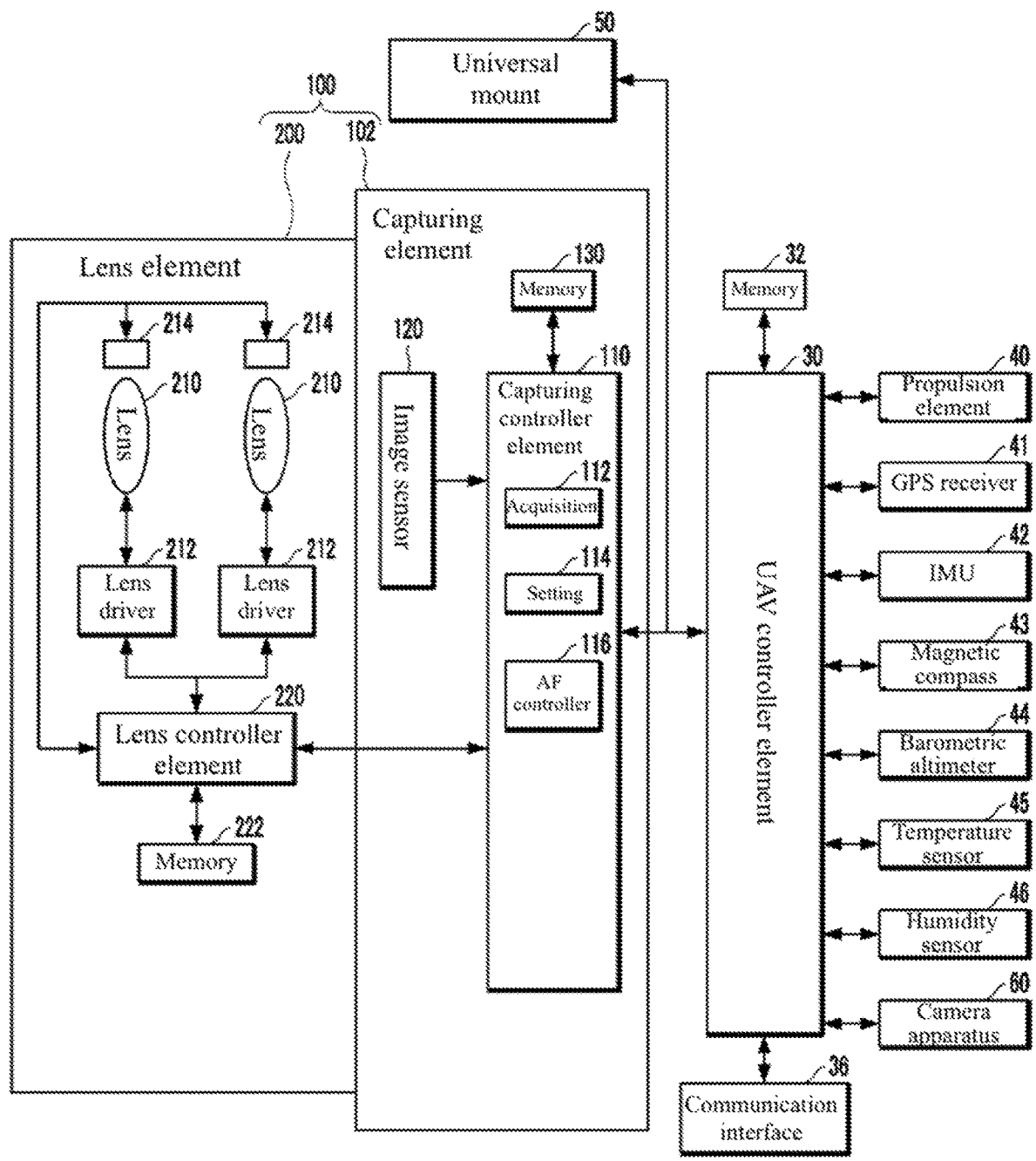
FIG. 2 illustrates a schematic of functional blocks of an unmanned aerial vehicle according to disclosed embodiments of the present disclosure.

FIG. 2 illustrates a schematic of functional blocks of the UAV 10. The UAV 10 may include a UAV controller element 30, a memory 32, a communication interface 36, a propulsion element 40, a global positioning system (GPS) receiver 41, an inertial measurement unit (IMU) 42, a magnetic compass 43, a barometric altimeter 44, a temperature sensor 45, a humidity sensor 46, the universal mount 50, the camera apparatus 60 and the camera apparatus 100.

The communication interface 36 may communicate with other devices such as the remote operation device 300. The communication interface 36 may receive instruction information, including various instruction for the UAV controller element 30, from the remote operation device 300. A memory 32 may store programs and the like required for the controller element 30 to control the propulsion element 40, the GPS receiver 41, the inertial measurement unit 42, the magnetic compass 43, the barometric altimeter 44, the temperature sensor 45, the humidity sensor 46, the universal mount 50, the camera apparatus 60, and the camera apparatus 100. The memory 32 may be a computer-readable recording medium, including at least one of flash memories such as SRAM, DRAM, EPROM, EEPROM, USB memories and the like. The memory 32 may be disposed inside the UAV main body 20 and may also be designed to be detachable from the UAV main body 20.

The UAV controller element 30 may control the flight and capturing of the UAV 10 according to programs stored in the memory 32. The UAV controller element 30 may be composed of a microprocessor such as a CPU or an MPU, a microcontroller such as an MCU, and the like. The UAV controller element 30 may control the flight and capturing of the UAV 10 according to instructions received from the remote operation device 300 through the communication interface 36. The propulsion element 40 may be configured to propel the UAV 10 and may include the plurality of propellers and the plurality of drive motors which rotate the plurality of propellers. The propulsion element 40 may rotate the plurality of propellers, through the plurality of drive motors according to the instructions from the UAV control unit 30, to fly the UAV 10.

The GPS receiver 41 may receive a plurality of time signals transmitted from a plurality of GPS satellites. The GPS receiver 41 may be configured to calculate a position (latitude and longitude) of the GPS receiver 41, that is, a position (latitude and longitude) of the UAV 10, according to the plurality of received signals. The IMU 42 may be configured to detect the attitude of the UAV 10. IMU 42 may detect accelerations of three axis directions including front-back, left-right, and up-down, and also detect angular velocities of three axis directions including the pitch axis, the roll axis and the yaw axis, which may be configured as the attitude of the UAV 10. The magnetic compass 43 may be configured to detect the orientation of the nose of the UAV 10. The barometric altimeter 44 may be configured to detect the flight height of the UAV 10. The barometric altimeter 44 may detect air pressure surrounding the UAV 10 and then convert detected air pressure into a height, thereby detecting the height of the UAV 10. The temperature sensor 45 may be configured to detect temperature surrounding the UAV 10, and the humidity sensor 46 may be configured to detect humidity surrounding the UAV 10.

The camera apparatus 100 may include a capturing element 102 and a lens element 200. The capturing element 102 may include an image sensor 120, a capturing controller element 110, and a memory 130. The image sensor 120 may be a CCD (charge-coupled device) sensor or a CMOS (complementary metal-oxide semiconductor) sensor. The image sensor 120 may convert imaging light of a plurality of lenses 210 into an electrical signal. That is, the image sensor 120 may output image data of optical images formed by the plurality of lenses 210 to the capturing controller element 110. The capturing controller element 110 may be composed of a microprocessor such as the CPU or MPU, a microcontroller such as the MCU, and the like. The capturing controller element 110 may control the camera apparatus 100 according operation instructions of the camera apparatus 100 from the UAV controller element 30. The memory 130 may be a computer-readable recording medium and may include at least one of flash memories such as SRAM, DRAM, EPROM, EEPROM, USB memories and the like. The memory 130 may store programs and the like required for the capturing controller element 110 to control the image sensor 120 and the like. The memory 130 may also be disposed inside the case of the camera apparatus 100 and may also be designed to be detachable from the case of the camera apparatus 100.

The lens element 200 may include the plurality of lenses 210, a plurality of lens driver 212, and a lens controller element 220. The plurality of lenses 210 may function as a zoom lens, a varifocal lens, and a focus lens. At least partial or all of the plurality of lenses 210 may be configured to be movable along an optical axis. The lens element 200 may be configured to be interchangeable lenses which are detached from the capturing element 102. The lens driver 212 may move at least partial or all of the plurality of lenses 210 along the optical axis through a mechanism part such as a cam ring. The lens driver 212 may include an actuator, and the actuator may include a stepper motor. The lens controller element 220 may drive the lens driver 212 according to lens control instructions from the capturing element 102, thereby moving one or more lenses 210 along the optical axis through the mechanism part. The lens control instructions may be, for example, zoom control instructions and focus control instructions.

The lens element 200 may also include a memory 222 and a position sensor 214. The lens controller element 220 may control the movement of the lenses 210 along the optical axis through the lens driver 212 according to the lens operation instructions from the capturing element 102. Partial or all of the lenses 210 may move along the optical axis. The lens controller element 220 may perform at least one of a zooming operation and a focusing operation by moving at least one of the lenses 210 along the optical axis. The position sensor 214 may be configured to detect positions of the lenses 210 and may detect a current zooming position or a current focusing position.

The lens driver 212 may include a shake correction mechanism. The lens controller element 220 may perform shake correction by moving the lenses 210 along the optical axis direction or a direction perpendicular with the optical axis through the shake correction mechanism. The lens driver 212 may perform the shake correction by driving the correction mechanism by the stepper motor. In addition, the shake correction mechanism may be driven by the stepper motor to move the image sensor 120 along the optical axis direction or the direction perpendicular with the optical axis, thereby performing the shake correction.

The memory 222 may store control values of the plurality of lenses 210 which are moved by the lens driver 212. The memory 222 may be a computer-readable recording medium and may include at least one of flash memories such as SRAM, DRAM, EPROM, EEPROM, USB memories and the like.

The camera apparatus 100 configured in above-mentioned manners may perform capturing during the flight of the UAV 10 in some cases. During the flight of the UAV 10, most subjects captured by the camera apparatus 100 may be subjects which are relatively far from the camera apparatus 100, such as landscapes. Therefore, in an automatic focusing process, the camera apparatus 100 may not necessary to control the driving of the focus lenses over the entire drivable range of the focus lenses in some cases. When the focus lenses are driven to a nearest side, the UAV 10 may collide with subjects because the subjects are too close to the UAV 10. Moreover, when the focus lenses are driven in the drive range from the infinity to the nearest side, it may need time for the focus lenses to perform focusing in some cases. The battery capacity and the flight time of the UAV 10 are both limited, such that the shorter the focusing time of the focus lens is, the better the UAV 10 is.

In order to avoid collisions between the UAV 10 and subjects during the flight, it may be better not to have subjects in a relatively near region of the UAV 10. For example, when an obstacle is within a preset distance, the UAV 10 may fly away from the obstacle or hover over such location. Therefore, it may be unlikely to have subjects required to be focused near the UAV 10 during the flight of the UAV 10. The UAV 10 mounted on the camera apparatus 100 may be used for portrait photography in some cases, and it may be likely to have subjects required to be focused near the UAV 10 in such situation.

Therefore, when the camera apparatus 100 is mounted on the UAV 10, the camera apparatus 100 in one embodiment may control the drive range of the focus lens based on the height of the UAV 10, that is, the height of the camera 100 from a reference position. The reference position may be a position on a preset reference plane. The reference position may be an intersection of a straight line, extending along a vertical direction from the camera apparatus 100 or the UAV 10, and the reference plane. The reference position may be an intersection of a straight line, extending along the vertical direction from a preset point such as a gravity center of the camera apparatus 100 or the UAV 10, and the reference plane. The reference plane may be, for example, a take-off surface of the UAV 10 such as a ground surface, a sea surface, a floor surface, a roof surface and the like, or a surface where the subjects captured by the camera apparatus 100 are located. For example, when the UAV 10 mounted with the camera apparatus 100 flies at a relatively low height, the driving of the focus lens may be controlled without limiting the drive range of the focus lens; and when the UAV 10 mounted with the camera apparatus 100 flies at a relatively high height, the drive range of the focus lens may be limited and the driving of the focus lens may be controlled.

The camera apparatus 100 may include an acquisition element 112, a setting element 114, and an AF controller element 116. The acquisition element 112 may acquire the height information indicating the height of the camera apparatus 100 from the reference position. The acquisition element 112 may acquire the height information indicating the height of the camera apparatus 100 from the ground. An infrared sensor may be disposed at the UAV 10 along the vertical direction. The infrared sensor may radiate infrared light downwardly and receive reflected light along an extending vertical direction, thereby detecting the distance from the UAV 10 to the ground. The acquisition element 112 may acquire information indicating the distance from the UAV 10 to the ground detected by the infrared sensor, and such information may be configured as the height information indicating the height of the camera apparatus 100 from the reference position.

The setting element 114 may be configured to set the drive range of the focus lens based on the height indicated by the height information acquired by the acquisition element 112. When the height indicated by the height information is greater than a preset threshold, the setting element 114 may set the drive range as a first drive range, thereby limiting the drive range of the focus lens. When the height indicated by the height information is less than or equal to the preset threshold, the setting element 114 may set the drive range as a first drive range which is larger than the first drive range. The first drive range is a drive range within which any subject is able to be focused, and the drive range is between a first distance and a second distance, being farther than the first distance, of the subject away from the camera apparatus 100. The second drive range is the drive range within which any subject is able to be focused, and the drive range is between a third distance and the second distance, being closer to the first distance, of the subject away from the camera apparatus 100. The first range may be, for example, the drive range from the infinity to 3.3 m that any subject is able to be focused. The second range may be, for example, the drive range from the infinity to 1.0 m that any subject is able to be focused.

The camera apparatus 100 may be used without being mounted on the UAV 10. Therefore, when the camera apparatus 100 is mounted on the UAV 10 and the height indicated by the height information is greater than the threshold value, the setting element 114 may set the drive range of the focus lens as the first drive range; when the camera apparatus 100 is mounted on the UAV 10 and the height indicated by the height information is less than or equal to the threshold value, the setting element 114 may set the drive range of the focus lens as the second drive range; and when the camera apparatus 100 is not mounted on the UAV 10, the setting element 114 may set the drive range of the focus lens as the second drive range.

Figures 3, 4:
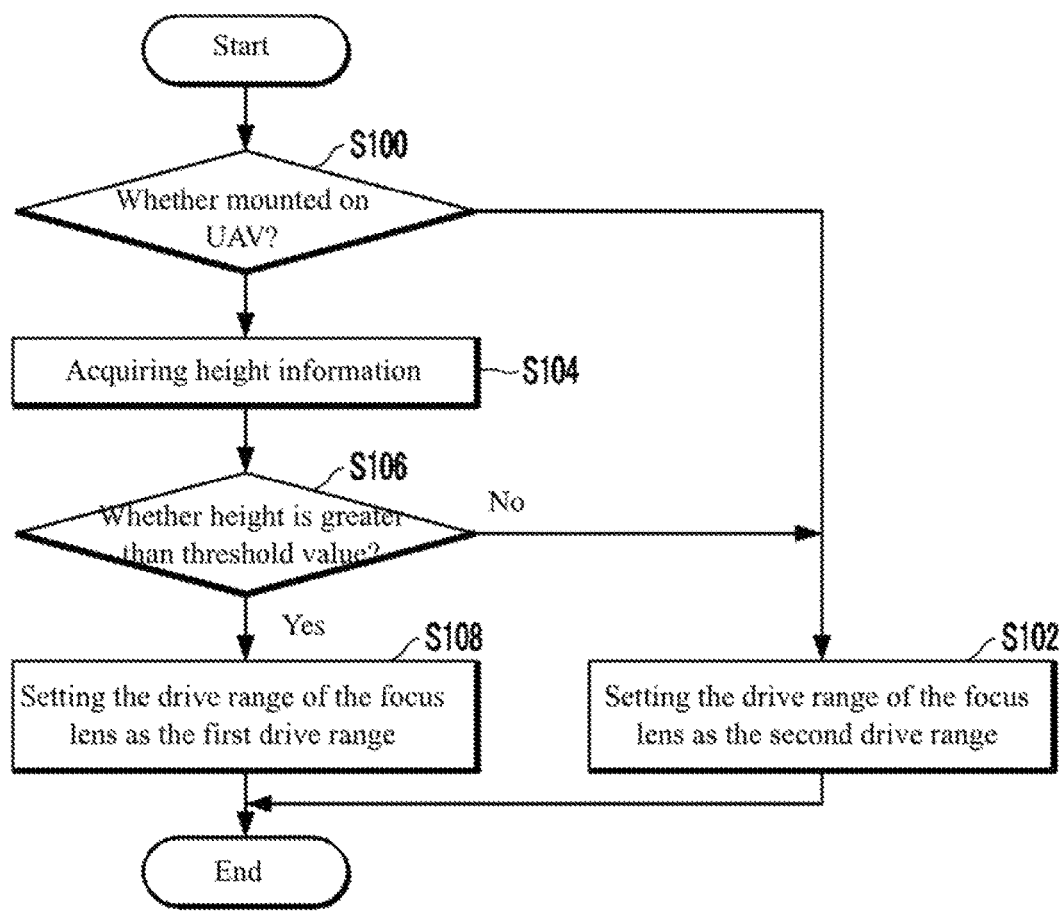
FIG. 3 illustrates a schematic of a reference table for determining a drive range according to disclosed embodiments of the present disclosure.
FIG. 4 illustrates a flow chart of a setting process of a drive range of a focus lens according to disclosed embodiments of the present disclosure.

The setting element 114 may set the drive range of the focus lens based on connection targets of the camera apparatus 100 and heights of the camera apparatus 100 by referring to a table shown in FIG. 3 and stored in the memory 130.

The AF controller element 116 may control the driving of the focus lens in the drive range configured by the setting element 114. The AF controller element 116 may control the driving of the focus lens during an autofocusing process in the drive range set by the setting element 114. The AF controller element 116 may use the drive range of the focus lens in the contrast AF as the drive range set by the setting element 114 and control the driving of the focus lens.

FIG. 4 illustrates a flow chart of the setting process of the drive range of the focus lens. For example, the setting element 114 may determine whether the camera apparatus 100 is mounted on the UAV 10 before performing autofocusing (S100). The setting element 114 may determine whether the camera apparatus 100 is mounted on the UAV 10 based on whether the setting element 114 can communicate with the UAV controller element 30. When the camera apparatus 100 is not mounted on the UAV 10, the setting element 114 may set the drive range of the focus lens as a normal second drive range (e.g., the drive range that the focusable subject is from the infinity to 1.0 m) (S102).

On another hand, when the camera apparatus 100 is mounted on the UAV 10, the setting element 114 may acquire the height information indicating the height of the camera apparatus 100 from the reference position through the acquisition element 112 (S104). When the height of the camera apparatus 100 is greater than the threshold value (S106), the setting element 114 may determine that there is a low possibility that the subject required to be focused is near the camera apparatus 100, and may set the drive range of the focus lens as the first drive range (e.g., the drive range that the focusable subject is from the infinity to 3.0 m) which is less than the second range, thereby limiting the drive range of the focus lens (S108). When the height of the camera apparatus 100 is less than or equal to the threshold value (S106), for example, in portrait photography using the camera apparatus 100 mounted on the UAV 10, the setting element 114 may determine that there is a possibility that the subject required to be focused is near the camera apparatus 100. Then, the setting element 114 may set the drive range of the focus lens as the second drive range which is larger than the first drive range without limiting the drive range of the focus lens (S102).

As described above, the camera apparatus 100 according to one embodiment may control the drive range of the focus lens based on the height of the camera apparatus 100 from the reference position. Therefore, unnecessary driving of the focus lens of the camera apparatus 100 mounted on the UAV 10 may be prevented; the driving of the focus lens may be effectively controlled; the power consumption generated for driving the focus lens may be suppressed; the flight time of the UAV 10 may be prevented from being shortened due to the unnecessary driving of the focus lens; and the capturing time of the camera apparatus 100 may be prevented from being shortened during the flight of the UAV 10.

Figure 5:
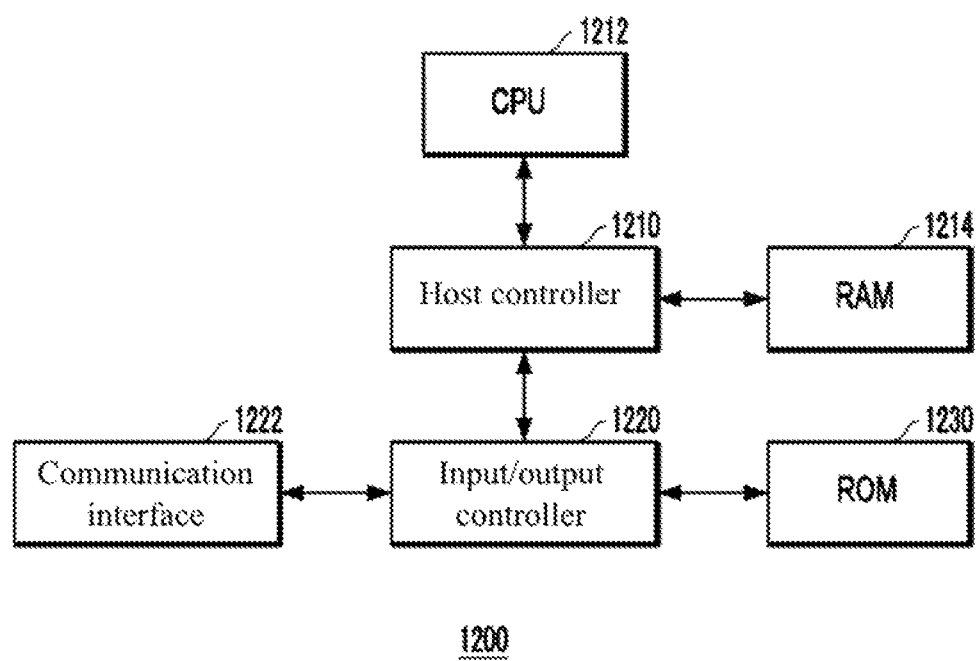
FIG. 5 illustrates a schematic for describing a hardware configuration according to disclosed embodiments of the present disclosure.

FIG. 5 illustrates an example of a computer 1200 which may fully or partially embody the aspects of the present disclosure. Programs installed on the computer 1200 may enable the computer 1200 to function as one or more "elements" of operations associated with the device according to the embodiments of the present disclosure or the device. Or, the programs may enable the computer 1200 to execute the operations or one or more "elements". The programs may enable the computer 1200 to execute a process or a stage of the process according to the embodiments of the present disclosure. The programs may be executed by a CPU 1212, which may enable the computer 1200 to execute specific operations associated with certain or all of the blocks in the flow charts and block diagrams in the embodiments of the present disclosure.

In one embodiment, the computer 1200 may include the CPU 1212 and a RAM 1214, which may be connected with each other through a host controller 1210. The computer 1200 may also include a communication interface 1222 and an input/output unit, where the communication interface 1222 may be connected to the host controller 1210 through an input/output controller 1220. The computer 1200 may further include a ROM 1230. The CPU 1212 may operate according to programs stored in the ROM 1230 and the RAM 1214 to control each component.

The communication interface 1222 may communicate with other electronic devices through a network. A hard disk drive may store programs and data used by the CPU 1212 inside the computer 1200. The ROM 1230 may store boot programs and the like executed by the computer 1200 upon activation and/or programs which depend on the hardware of the computer 1200. The programs may be provided through a computer-readable recording medium, including a CR-ROM, a USB memory or an IC card, or a network. The programs may be installed in the RAM 1214 or the ROM 1230 as an example of the computer-readable recording medium and may be executed by the CPU 1212. The information processing described in the programs may be read by the computer 1200 and may facilitate cooperation between the programs and the various types of hard resources described above. The device or method may be composed by the implemented operation or processing of information according to the use of the computer 1200.

For example, when performing communications between the computer 1200 and an external device, the CPU 1212 may execute communication programs loaded in the RAM 1214 and may also instruct the communication interface 1222 to perform communication processing based on the processing described in the communication programs. Under the control of the CPU 1212, the communication interface 1222 may read transmission data provided in a transmission buffer and stored in the recording medium such as the RAM 1214, the USB memory and the like, and may transmit read transmission data to a network or write reception data received from the network into a reception buffer or the like provided in the recording medium.

Furthermore, the CPU 1212 may enable the RAM 1214 to read all or required portions of a file or a database stored in the external recording medium such as the USB memory and the like, and also perform various types of processing on the data on the RAM 1214, and next, the CPU 1212 may write the processed data back to the external recording medium.

Various types of information such as various types of programs, data, tables, databases and the like may be stored in the recording medium and subjected to information processing. For the data read from the RAM 1214, the CPU 1212 may execute various types of processing described in throughout the present disclosure and maybe specified by instruction sequences of the programs, including various types of information processing, conditional judgements, conditional transfers, information searches/replacements and the like. In addition, the CPU 1212 may search information in files, databases, and the like in the recording medium. For example, when a plurality of entries having the attribute value of a first attribute associate with the attribute value of a second attribute are stored in the recording medium, the CPU 1212 may search the entry matching the condition of the attribute value of a specified first attribute from the plurality of entries, and read the attribute value of the second attribute stored in the entry, thereby obtaining the attribute value of the second attribute associated with the first attribute satisfying a preset condition.

The above-mentioned programs or software modules may be stored in the computer 1200 or the computer-readable storage medium of the computer 1200. Furthermore, the recording medium such as the hard disk, the RAM and the like provided in a server system which is connected to a dedicated communication network or the Internet may be used as the computer-readable storage medium, thus programs may be provided to the computer 1200 through the network.

It should be noted that the execution orders of various processing including actions, sequences, steps, and stages in the devices, systems, programs, and methods shown in the claims, the present disclosure, and the drawings of the present disclosure may be implemented in any order, as long as "before", "in advance" and the like are not specifically stated, and the output of a previous processing is not used in a subsequent processing. The operation flow in the claims, the present disclosure, and the drawings of the present disclosure has been described using "first", "next", and the like for convenience, but it may not mean that the order must be implemented.

The above-mentioned description may merely the embodiments of the present disclosure and may not intended to limit the scope of the present disclosure. Those skilled in the art should understand that various modifications may be made in the present disclosure, or equivalent replacements of some or all of the technical features may be made in the present disclosure. However, the modifications and equivalent replacements made within the spirit and principle of the present disclosure should be included in the scope of the various claims of the present disclosure.

What is claimed is:

1. A control apparatus for controlling a driving of a focus lens included in a camera apparatus, the apparatus comprising:
   a memory, storing a program; and
   a processor, configured to execute the program to set a drive range of the focus lens based on a height of the camera apparatus with respect to a reference position and control the driving of the focus lens in the drive range, wherein:
   when the camera is mounted on a flying object, the processor is further configured to:
      in response to the height of the camera apparatus with respect to the reference position being greater than a threshold value, set the corresponding drive range of the focus lens to be a first drive range; and
      in response to the height of the camera apparatus with respect to the reference position being less than or equal to the threshold value, set the corresponding drive range of the focus lens to be a second drive range, the second drive range being larger than the first drive range, wherein:
the first drive range is a drive range within which a subject is able to be focused, and the first drive range is between a first distance from the subject to the camera apparatus and a second distance from the subject to the camera apparatus, the first distance being finite and the second distance being infinity; and
the second drive range is a drive range within which a subject is able to be focused, and the second drive range is between a third distance from the subject to the camera apparatus and the second distance from the subject to the camera apparatus, the third distance being shorter than the first distance and being finite.

2. The apparatus according to claim 1, wherein:
the processor is configured to execute the program to control the driving of the focus lens during an autofocusing process in the drive range set by the processor.

3. The apparatus according to claim 1, wherein:
when the camera apparatus is not mounted on a flying object, the processor is configured to execute the program to set the drive range as the second drive range.

4. The apparatus according to claim 1, wherein:
when a connection target of the camera apparatus is other than a flying object or there is no connection target of the camera apparatus, the processor is configured to execute the program to set the drive range as the second drive range.

5. A camera apparatus, comprising:
a control apparatus, comprising:
a memory storing a program, and
a processor, configured to execute the program to set a drive range of a focus lens based on a height of the camera apparatus with respect to a reference position, and control a driving of the focus lens in the drive range; and
an image sensor, configured to capture an optical image formed by the focus lens, wherein:
when the camera is mounted on a flying object, the processor is further configured to:
in response to the height of the camera apparatus with respect to the reference position being greater than a threshold value, set the corresponding drive range of the focus lens to be a first drive range; and
in response to the height of the camera apparatus with respect to the reference position being less than or equal to the threshold value, set the corresponding drive range of the focus lens to be a second drive range, the second drive range being larger than the first drive range, wherein:
the first drive range is a drive range within which a subject is able to be focused, and the first drive range is between a first distance from the subject to the camera apparatus and a second distance from the subject to the camera apparatus, the first distance being finite and the second distance being infinity; and
the second drive range is a drive range within which a subject is able to be focused, and the second drive range is between a third distance from the subject to the camera apparatus and the second distance from the subject to the camera apparatus, the third distance being shorter than the first distance and being finite.

6. A flying object, comprising:
a camera apparatus, including the camera apparatus according to claim 5.

7. A control method for controlling a driving of a focus lens included in a camera apparatus, the method comprising:
setting a drive range of the focus lens based on a height of the camera apparatus with respect to a reference position, including, when the camera is mounted on a flying object:
in response to the height of the camera apparatus with respect to the reference position being greater than a threshold value, set the corresponding drive range of the focus lens to be a first drive range; and
in response to the height of the camera apparatus with respect to the reference position being less than or equal to the threshold value, set the corresponding drive range of the focus lens to be a second drive range, the second drive range being larger than the first drive range, wherein:
the first drive range is a drive range within which a subject is able to be focused, and the first drive range is between a first distance from the subject to the camera apparatus and a second distance from the subject to the camera apparatus, the first distance being finite and the second distance being infinity; and
the second drive range is a drive range within which a subject is able to be focused, and the second drive range is between a third distance from the subject to the camera apparatus and the second distance from the subject to the camera apparatus, the third distance being shorter than the first distance and being finite; and
controlling the driving of the focus lens in the drive range.

* * * * *